United States Patent
Sapp et al.

(10) Patent No.: US 12,325,452 B1
(45) Date of Patent: Jun. 10, 2025

(54) AGENT TRAJECTORY PREDICTION USING DYNAMIC CANDIDATE FUTURE INTENTS

(71) Applicant: Waymo LLC, Mountain View, CA (US)

(72) Inventors: Benjamin Sapp, Marina del Rey, CA (US); Avikalp Srivastava, Sunnyvale, CA (US); Kai Ding, Santa Clara, CA (US); Andre Liang Cornman, San Francisco, CA (US); Hee Jin Jeong, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 384 days.

(21) Appl. No.: 17/901,747

(22) Filed: Sep. 1, 2022

Related U.S. Application Data

(60) Provisional application No. 63/239,449, filed on Sep. 1, 2021.

(51) Int. Cl.
| | |
|---|---|
| *B60W 60/00* | (2020.01) |
| *B60W 40/04* | (2006.01) |
| *B60W 40/06* | (2012.01) |
| *B60W 50/00* | (2006.01) |
| *G06N 3/084* | (2023.01) |

(52) U.S. Cl.
CPC ...... *B60W 60/00274* (2020.02); *B60W 40/04* (2013.01); *B60W 40/06* (2013.01); *B60W 50/0097* (2013.01); *B60W 60/0011* (2020.02); *G06N 3/084* (2013.01); *B60W 2554/4045* (2020.02); *B60W 2554/4046* (2020.02); *B60W 2554/80* (2020.02); *B60W 2556/10* (2020.02); *B60W 2556/35* (2020.02)

(58) Field of Classification Search
CPC .......... B60W 60/00274; B60W 40/04; B60W 40/06; B60W 50/0097; B60W 60/0011; B60W 2554/4045; B60W 2554/4046; B60W 2554/80; B60W 2556/10; B60W 2556/35; G06N 3/084
See application file for complete search history.

(56) References Cited

U.S. PATENT DOCUMENTS

| | | | |
|---|---|---|---|
| 2021/0001897 A1* | 1/2021 | Chai | G06F 18/214 |
| 2021/0129871 A1 | 5/2021 | Malla et al. | |
| 2021/0191395 A1* | 6/2021 | Gao | B60W 60/00276 |
| 2021/0192748 A1 | 6/2021 | Morales et al. | |
| 2021/0200230 A1 | 7/2021 | Ross | |
| 2022/0204030 A1* | 6/2022 | Nishimura | B60W 30/0956 |

OTHER PUBLICATIONS

"A Comparative Evaluation of Probabilistic and Deep Learning Approaches for Vehicular Trajectory Prediction" by L. Irio et al., IEEE Open Journal of Vehicular Technology, current version Apr. 1, 2021 (Year: 2021).*
"Interacting Vehicle Trajectory Prediction with Convolutional Recurrent Neural Networks" by S. Mukherjee, et al., 2020 IEEE International Conference on Robotics and Automation (ICRA) May 31-Aug. 31, 2020. Paris, France (Year: 2020).*

* cited by examiner

*Primary Examiner* — Kito R Robinson
*Assistant Examiner* — Tanya C Sienko
(74) *Attorney, Agent, or Firm* — Fish & Richardson P.C.

(57) ABSTRACT

Methods, systems, and apparatus, including computer programs encoded on computer storage media, for agent trajectory prediction using candidate future intents.

21 Claims, 4 Drawing Sheets

AGENT TRAJECTORY PREDICTION USING DYNAMIC CANDIDATE FUTURE INTENTS

CROSS-REFERENCE TO RELATED APPLICATION

This application claims priority to U.S. Provisional Application No. 63/239,449, filed on Sep. 1, 2021. The disclosure of the prior application is considered part of and is incorporated by reference in the disclosure of this application.

BACKGROUND

This specification relates to predicting the future trajectory of an agent in an environment.

The environment may be a real-world environment, and the agent may be, e.g., a vehicle, cyclist, pedestrian, or other vehicle in the environment. Predicting the future trajectories of agents is a task required for motion planning, e.g., by an autonomous vehicle.

Autonomous vehicles include self-driving cars, boats, and aircraft. Autonomous vehicles use a variety of on-board sensors and computer systems to detect nearby objects and use such detections to make control and navigation decisions.

SUMMARY

This specification generally describes a system implemented as computer programs on one or more computers in one or more locations that predicts the future trajectory of an agent in an environment.

The subject matter described in this specification can be implemented in particular embodiments so as to realize one or more of the following advantages.

Predicting the future behavior of road users is a challenging and important problem for autonomous driving and control of other types of autonomous vehicles.

The system described in this specification generates a trajectory prediction output for a target agent in an environment by processing scene data characterizing the environment and each of a plurality of candidate future intents for the target agent. The trajectory prediction output includes a respective future trajectory prediction for each candidate future intent. The candidate future intents for the target agent can be dynamically generated by an external system given the current scene and one or more past scenes in the environment. That is, each candidate future intent for the target agent can include intent data characterizing a likely future route of the target agent given the past and current state of the environment. Generating the trajectory prediction output based on dynamically generated candidate future intents from an external system can enable the system to distinguish between and refine candidate future intents that are likely given the current scene and past scenes in the environment and the target agent's previous states. That is, the system can focus on particular candidate future intents generated based on the scene rather than attempting to cover the entire multi-modal space at once, which can enable the system to achieve significant performance improvement (e.g., achieving a more accurate future trajectory prediction for the target agent) over more conventional systems since the dynamic candidate future intents are able to be better tailored to the present environment.

The candidate future intents for the target agent can also each include semantic data characterizing the action type of the candidate future intent. Including semantic data for the action type of the candidate future intent can enable the system to generate candidate future intents by considering each action type individually with data-driven or heuristic methods. Considering each action type individually can enable the system to generate a better individual future trajectory prediction for a particular action type for the target agent. Additionally, considering each action type individually can help prevent a mode collapse in the trajectory future predictions to a single action type (e.g., with all trajectory future predictions characterizing a right turn), therefore enabling a more encompassing road graph coverage in the trajectory future predictions and ultimately reducing risk in the downstream planning for the autonomous vehicle. Furthermore, the semantic data enables the trajectory future predictions to be human interpretable and semantically useful and interpretable by downstream planning systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a trained machine learning model, referred to in this specification as a "trajectory prediction system," to generate a respective trajectory prediction output for each of one or more surrounding agents in the vicinity of the vehicle in an environment.

In this specification, a "surrounding agent" can refer, without loss of generality, to a vehicle, bicycle, pedestrian, ship, drone, or any other moving object in an environment.

This specification also describes how training examples generated by vehicles or other sources can be used to effectively train the trajectory prediction system to accurately and reliably make predictions.

Figure 1:
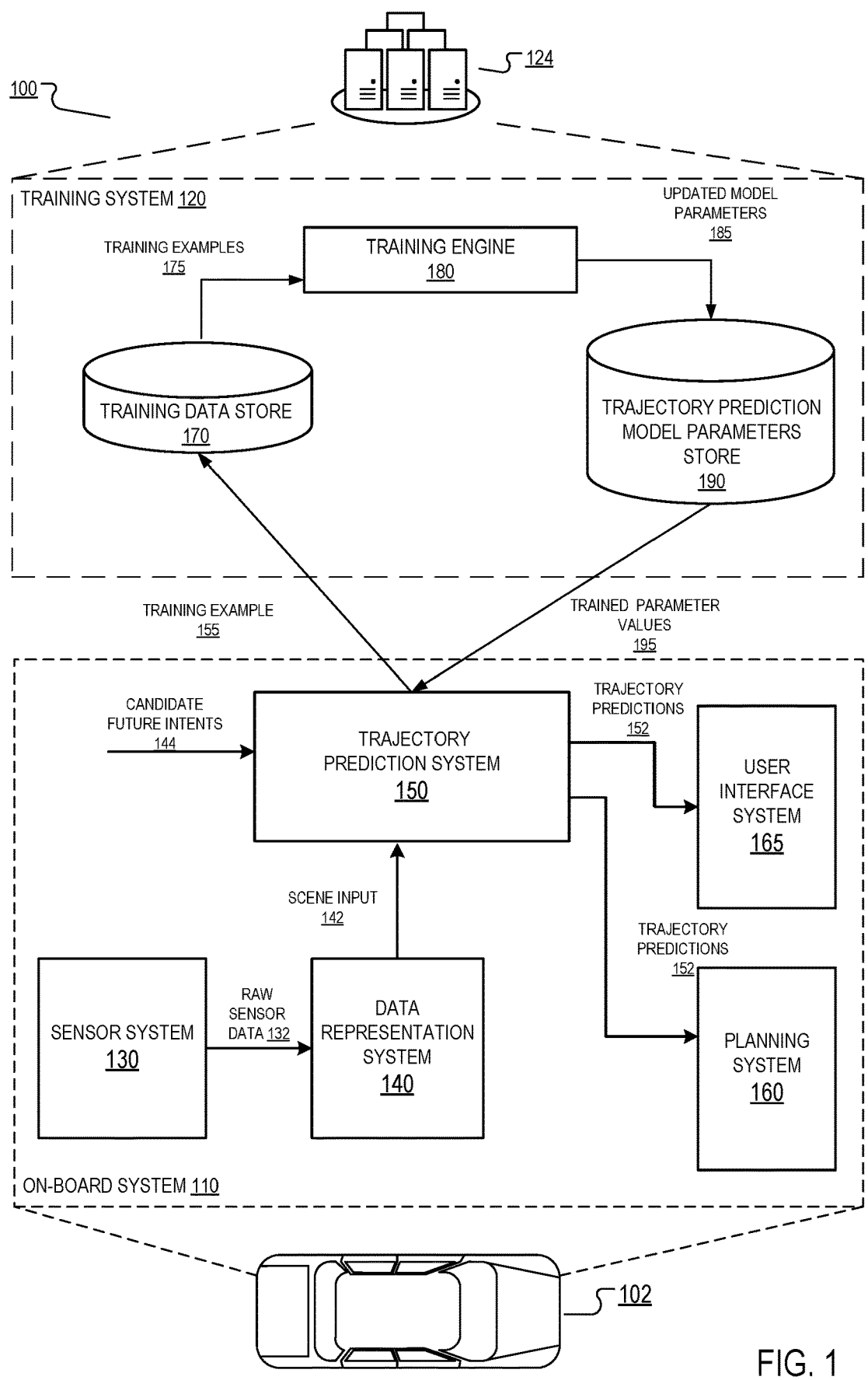
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 110 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semiautonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 102 can alert the driver of the vehicle 102 or take an autonomous driving action when an obstacle is detected, when the vehicle departs from a driving lane, or when an object is detected in a blind spot of the human driver.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a data representation system 140.

The data representation system 140, also on-board the vehicle 102, receives the raw sensor data 132 from the sensor system 130 and generates scene data 142. The scene data 142 characterizes the current state of the environment surrounding the vehicle 102 as of the current time point.

For example, the scene data can characterize, for all surrounding agents in the environment, a current state at the current time point and a previous state at one or more respective previous time points. In other words, the scene data can include, for all surrounding agents in the environment, data that characterizes a previous trajectory of the agent in the environment up to the current time point. The state of an agent at a time point can include the location of the agent at the time point and, optionally, values for a predetermined set of motion parameters at the time point. As a particular example, the motion parameters can include a heading for the agent, a velocity of the agent, and/or an acceleration of the agent.

The scene data also includes data characterizing a current state of the vehicle at the current time point and a previous state of the vehicle at one or more respective previous time points.

In some implementations, the scene data also includes data characterizing features of the environment that are obtained from map information characterizing the environment. These features can include (i) dynamic features of the environment, e.g., traffic light states at the current time point, (ii) static features of the environment, e.g., road graph data characterizing one or more of lane connectivity, lane type, stop lines, speed limits, and so on, or (iii) both.

The data representation system 140 provides the scene data 142 to a trajectory prediction system 150, also on-board the vehicle 102.

The trajectory prediction system 150 processes the scene data 142 to generate a respective trajectory prediction output 152 for each of one or more of the surrounding agents. The trajectory prediction output 152 for a given agent characterizes the future trajectory of the agent after the current time point.

More specifically, when generating the trajectory prediction output 152 for a given agent, the trajectory behavior prediction system 150 receives the scene data 142 and respective intent data for each of a set of candidate future intents 144 for the given agent. That is, for each candidate future intent 144, the system 150 receives respective intent data characterizing that intent.

Each candidate future intent 144 characterizes a different possible route that can be travelled by the given agent after the current time point. For example, the candidate future intents 144 can be dynamically generated by another component, e.g., a behavior prediction system or other system, on-board the vehicle so that the candidate future intents 144 cover only routes that are plausible given the current scene (and one or more previous scenes). However, the set of candidate future intents 144 received by the system 150 do not include any information about which plausible route is more likely to be traversed by the given agent or what the likely trajectory or trajectories of the given agent will be if the agent determines to traverse a given route. That is, an agent traversing a given route can still follow many different trajectories, i.e., because the given route does not specify any information about the velocity of the agent at any given time and because the agent may need to deviate from the route to account for road features or the motion of other agents.

Thus, the trajectory prediction output 152 for the given agent includes a respective future trajectory prediction for each of the respective candidate future intents for the given agent. That is, for each candidate future intent, the trajectory prediction system 150 predicts the likely future trajectories of the given agent given that the agent follows the candidate future intent.

The trajectory prediction output 152 can also include information characterizing which of the candidate future intents are most likely to be traversed by the given agent.

Therefore, the trajectory prediction output 152 "refines" the candidate future intents by incorporating a temporal dimension into the predictions and assigning likelihoods to different future intents, to different variations of different future intents, or both.

As a particular example, the future trajectory prediction for each candidate future intent can include a respective likelihood score, e.g., a probability, for each of multiple variations of the intent. A "variation" of an intent is a trajectory that can be followed by an agent having that intent. That is, unlike the intents, which do not include any velocity or other temporal components, each variation is a trajectory that defines a respective state of the agent at each of multiple future time points.

Generally, the respective score for each of the one or more variations of the candidate future intent that represents a predicted likelihood that the variation is the most similar trajectory to the actual future trajectory of the given agent after the current time point.

For example, the predicted likelihood can be a joint likelihood, e.g., P (variation ji, candidate future intent i), that variation j of candidate future intent i is the most similar to the actual future trajectory of the given agent.

As another example, the predicted likelihood can be a conditional likelihood, e.g., P (variation ji|candidate future intent i), that variation j of candidate future intent i is the most similar to the actual future trajectory given that candidate future intent i is the most similar to the actual future trajectory.

If the predicted likelihood is a conditional likelihood, the set of scores can also include a respective predicted likelihood for each candidate future intent that defines the respective likelihood that the candidate future intent is the most similar intent to the actual future trajectory of the given agent, i.e., that the actual future trajectory will more closely follow the candidate future intent than any of the other candidate future intents.

Generating the trajectory prediction outputs will be described in more detail below with reference to FIGS. 2 and 3.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the trajectory prediction outputs 152 generated by the trajectory prediction system 150 to one or more other on-board systems of the vehicle 102, e.g., the planning system 160 and/or a user interface system 165.

When the planning system 160 receives the trajectory prediction outputs 152, the planning system 160 can use the trajectory prediction outputs 152 to generate planning decisions that plan a future trajectory of the vehicle, i.e., to generate a new planned vehicle path. For example, the trajectory prediction outputs 152 may contain a prediction that a particular surrounding agent is likely to cut in front of the vehicle 102 at a particular future time point, potentially causing a collision. In this example, the planning system 160 can generate a new planned vehicle path that avoids the potential collision and cause the vehicle 102 to follow the new planned path, e.g., by autonomously controlling the steering of the vehicle, and avoid the potential collision.

When the user interface system 165 receives the trajectory prediction outputs 152, the user interface system 165 can use the trajectory prediction outputs 152 to present information to the driver of the vehicle 102 to assist the driver in operating the vehicle 102 safely. The user interface system 165 can present information to the driver of the vehicle 102 by any appropriate means, for example, by an audio message transmitted through a speaker system of the vehicle 102 or by alerts displayed on a visual display system in the agent (e.g., an LCD display on the dashboard of the vehicle 102). In a particular example, the trajectory prediction outputs 152 may contain a prediction that a particular surrounding agent is likely to cut in front of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

To generate the trajectory prediction outputs 152, the trajectory prediction system 150 can use trained parameter values 195, i.e., trained model parameter values of the trajectory prediction system 150, obtained from a trajectory prediction model parameters store 190 in the training system 120.

The training system 120 is typically hosted within a data center 124, which can be a distributed computing system having hundreds or thousands of computers in one or more locations.

The training system 120 includes a training data store 170 that stores all the training data used to train the trajectory prediction system i.e., to determine the trained parameter values 195 of the trajectory prediction system 150. The training data store 170 receives raw training examples from, e.g., agents operating in the real world, from computer simulations of the real-world, or one or more computer programs that generate synthetic navigation scenarios by modifying real-world data.

For example, the training data store 170 can receive a raw training example 155 from the vehicle 102 and one or more other agents that are in communication with the training system 120. The raw training example 155 can be processed by the training system 120 to generate a new training example. The raw training example 155 can include scene data, i.e., like the scene data 142, that can be used as input for a new training example. The raw training example 155 can also include outcome data characterizing the state of the environment surrounding the vehicle 102 at the one or more future time points. This outcome data can be used to generate ground truth trajectories for one or more agents in the vicinity of the vehicle at the time point characterized by the scene data. Each ground truth trajectory identifies the actual trajectory (as derived from the outcome data) traversed by the corresponding agent at the future time points. For example, the ground truth trajectory can identify spatial locations in an agent-centric coordinate system to which the agent moved at each of multiple future time points.

The training data store 170 provides training examples 175 to a training engine 180, also hosted in the training system 120. The training engine 180 uses the training examples 175 to update model parameters that will be used by the trajectory prediction system 150, and provides the updated model parameters 185 to the trajectory prediction model parameters store 190. Once the parameter values of the trajectory prediction system 150 have been fully trained, the training system 120 can send the trained parameter values 195 to the trajectory prediction system 150, e.g., through a wired or wireless connection.

Training the trajectory prediction system 150 is described in more detail below with reference to FIG. 4.

Figure 2:
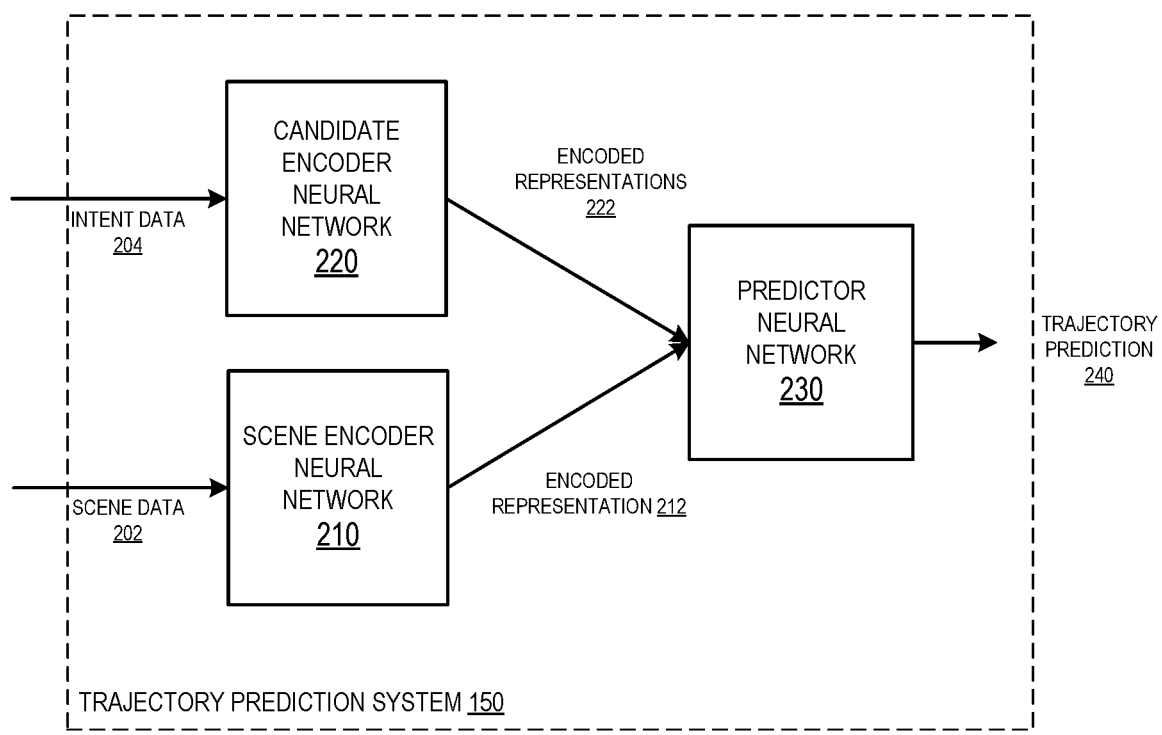
FIG. 2 shows the operation of the trajectory prediction system to generate a trajectory prediction output for a target agent.

FIG. 2 shows an example of the operation of the trajectory prediction system 150.

As shown in FIG. 2, the trajectory prediction system 150 includes a scene encoder neural network 210, a candidate encoder neural network 220, and a predictor neural network 230.

To generate a trajectory prediction, the system 150 obtains scene data 202 characterizing a scene in an environment that includes one or more agents. The one or more agents include a target agent for which the system 150 is making the trajectory prediction.

For each of multiple different candidate future intents for the target agent, the system 150 receives respective intent data 204 that characterizes the candidate future intent.

At a high level, the system 150 processes the scene data 202 using the scene encoder neural network 210 to generate an encoded representation 212 of the scene data 202. An encoded representation (also referred to as an "embedding"), as used in this specification, is an ordered collection of numerical values. For example, an encoded representation or an embedding can be a vector or a matrix of floating point or other numeric values that has a pre-determined dimensionality.

The system 150 processes the respective intent data 204 for each of the candidate future intents using the candidate encoder neural network 220 to generate a respective encoded representation 222 of each of the candidate future intents.

The system 150 processes the encoded representation 212 of the scene and the respective encoded representations 222 of each of the candidate future intents using the predictor neural network 230 to generate a trajectory prediction output 240 that includes a respective future trajectory prediction for each of the respective candidate future intents.

In some implementations, the candidate future intents for the target agent received by the system 150 can be dynamically generated based on the current scene and one or more past scenes in the environment (e.g., the state of one or more other agents in the environment, such as vehicles, pedestrians, road workers, cyclists, animals, etc.; the state of one or more other objects in the environment, such as road lanes, road signs, traffic lights, parked or double-parked vehicles, etc.). As a particular example, the candidate future intents can be generated by a behavior prediction system (e.g., a behavior prediction system on-board the autonomous vehicle).

In some implementations, the respective intent data 204 for each candidate future intent can include geometric information characterizing a sequence of waypoint spatial locations in the environment. Each waypoint spatial location can include spatial coordinates (e.g., x, y positions) and, optionally, a heading, e.g., a vector direction, of the target agent when at the spatial location. However, the candidate future intents do not define at which time point any of the spatial coordinates will be reached by the target agent.

In some implementations, in addition to or instead of the geometric information, the respective intent data 204 for each candidate future intent can include semantic data characterizing an action type of the candidate future intent (e.g., semantic data characterizing a left turn into available lane 1, a left turn into available lane 2, a left turn into available lane 3, continuing straight, a right turn, a U-turn, parallel parking, etc.).

The semantic data for a particular action type can be encoded as a one-hot vector (e.g., a vector that is all zeros except for a single one, where the one specifies the action type). For example, the system 150 can receive a respective candidate future intent for each available action type (e.g., three for left turns, one for each of three available left lanes; one for continuing straight into the only available straight lane; and one for turning right into the only available right turn lane).

In some implementations, instead of or in addition to the geometric information, the action types, or both, the respective intent data 204 for each candidate future intent can include reference data characterizing objects in the environment corresponding to the candidate future intent (e.g., a crosswalk id for a crosswalk traversed by the candidate future intent, a parking space id for a target parking space, etc.).

The candidate encoder neural network 220 can be configured in any appropriate way to generate a respective encoded representation 222 of each candidate future intent. In particular, each candidate future intent for the target agent includes intent data 204 that characterizes the candidate future intent, and the candidate encoder neural network 220 can be configured to process any appropriate form of intent data 204 to generate the respective encoded representations 222.

For example, the candidate encoder neural network 220 can include any appropriate types of neural network layers (e.g., fully-connected layers, attention-layers, convolutional layers, recurrent layers, etc.) in any appropriate numbers (e.g., 1 layer, 5 layers, or 25 layers), and connected in any appropriate configuration (e.g., as a linear sequence of layers).

The candidate encoder neural network 220 can process each candidate future intent separately, can process all candidate future intents together, or can process each candidate future intent using each other candidate future intent as context. In a particular example, the candidate encoder neural network 220 can be a convolutional neural network to process intent data encoded as a roadgraph map. In another example, the candidate encoder neural network 220 can include multiple input heads, where each input head processes a respective type of intent data (e.g., a convolutional neural network head to process geometric information for each of multiple time points, a fully-connected neural network head to process semantic or reference data, etc.).

The scene encoder neural network can be configured to process any appropriate form of scene data, e.g., image data, video data, lidar data, hyper-spectral data, or any combination thereof, to generate the encoded representation of the scene data. The scene data can include multiple types of scene data, e.g., road data characterizing multiple road features in the environment (e.g., road lanes, road signs, traffic lights, double-parked vehicles, etc.), and agent data characterizing the state of each agent (e.g., x, y positions, speed, and heading of vehicles, pedestrians, road workers, policer officers directing traffic, cyclists, animals, etc.) in the environment at the current time point and at each of multiple previous time points before the current time point.

In some implementations, the scene encoder neural network can include a respective input head for each of multiple types of scene data to generate a respective embedding of that type of scene data. For example, the scene encoder neural network can include a road encoder head to generate a respective embedding of each of multiple road features in the environment. The scene encoder neural network can include an agent state history encoder head to generate a respective agent state history embedding characterizing the state of the target agent at the current time point and at each of multiple previous time points before the current time point. The scene encoder neural network can include an interaction encoder head to generate a respective interaction embedding characterizing the motion of other agents in the environment relative to the target agent. The respective embedding of each type of scene data can be represented by, e.g., a collection of ordered numerical values, such as a vector or matrix of numerical values.

In some implementations, the scene encoder neural network can include a context encoder to generate the encoded representation of the scene data from the respective embeddings of the scene data. The encoded representation of the scene data can be represented by, e.g., a collection of ordered numerical values, such as a vector or matrix of numerical values.

For example, the context encoder can initialize the encoded representation of the scene data from the agent state history embedding and the interaction embedding, and update the encoded representation of the scene data at each of multiple iterations using the road feature embeddings. In some implementations, the context encoder can include a first gating neural network and a second gating neural network. The context encoder can initialize a gating embedding for each road feature from the road feature embedding for the road feature.

At each iteration, the context encoder can process the encoded representation of the scene data to generate a gating embedding for the scene data using the first gating neural network. For each road feature, the context encoder can process the gating embedding for the road feature using the second gating neural network to generate a gating vector. Then, the context encoder can update the gating embedding for the road feature using the gating vector and the gating embedding for the scene data. After updating the gating embeddings for the road features, the context encoder can update the encoded representation of the scene data using the gating embeddings for the road features.

In some implementations, the context encoder can update the encoded representation of the scene data by combining the gating embeddings to generate a combined embedding (e.g., by concatenating the gating embeddings, or by using a pooling layer, such as a max pooling layer or average pooling layer). Then the context encoder can process the combined gating embedding using an updating neural network to generate an update to the encoded representation of the scene data.

In some implementations, the context encoder can update the gating embedding for a road feature using the result an elementwise multiplication of the respective gating vector for the road feature and the gating embedding for the scene data. For example, the updated gating embedding for the road feature can be the result of the elementwise multiplication of the gating vector for the road feature and the gating embedding for the scene data.

The predictor neural network 230 can be configured in any appropriate way to process the encoded representation 212 of the scene data and the respective encoded representations 222 of each of the candidate future intents in order to generate a trajectory prediction output 240 for the target agent.

In particular, the trajectory prediction output 240 can include a respective future trajectory prediction for each of the candidate future intents.

For example, the respective future trajectory prediction for a candidate future intent can include information characterizing one or more likely future trajectories of the target agent that reflect the corresponding candidate future intent, i.e., that one or more likely future trajectories of the target agent if the target agent has the corresponding candidate future intent.

In some implementations, the predictor neural network 230 can be configured to generate a respective fused embedding of each of the candidate future intents as an intermediate step of generating the trajectory prediction output by combining the encoded representation of the scene and the respective encoded representations of each of the candidate future intents.

For each candidate future intent, the predictor neural network 230 can process the respective fused embedding of the candidate future intent to generate the respective future trajectory prediction for the candidate future intent.

For example, the predictor neural network 230 can include a fused embedding neural network to generate the respective fused embeddings of the candidate future intents. The fused embedding neural network can include any appropriate types of neural network layers (e.g., fully-connected layers, attention-layers, convolutional layers, recurrent layers, etc.) in any appropriate numbers (e.g., 1 layer, 5 layers, or 25 layers), and connected in any appropriate configuration (e.g., as a linear sequence of layers).

In a particular example, the fused embedding neural network can generate the respective fused embedding of each candidate future intent using the encoded representation 212 of the scene data as context.

The fused embedding neural network can initialize a current respective fused embedding of each candidate future intent and a current context vector, and update both the fused embeddings and the context vector at each of one or more gating iterations. Before the first gating iteration, for each candidate future intent, the fused embedding neural network can initialize the current respective fused embedding of the candidate future intent as the encoded representation 222 of the candidate future intent, and the current context vector as the encoded representation 212 of the scene data.

The fused embedding neural network can include a respective first gating neural network layer (e.g., a fully-connected layer) to process the current context vector to generate a gating embedding of context vector at each gating iteration. The fused embedding neural network can also include a respective second gating neural network layer (e.g., a fully-connected layer) to process each current fused embedding to generate a respective gating embedding of the corresponding candidate future intent at each gating iteration. The fused embedding neural network can generate the respective updated fused embedding of each candidate future intent by combining the gating embedding of the context vector with the gating embedding of the respective candidate future intent (e.g., using an elementwise multiplication). The embedding neural network can then generate an updated context vector from the fused embeddings of the candidate future intents (e.g., using a pooling operation, such as max pooling or average pooling). For each gating iteration prior to the final gating iteration, the updated fused embeddings can be the current fused embeddings for the next gating iteration and the updated context vector can be the current context vector for the next gating iteration. After the final gating iteration, the fused embedding neural network can output the updated fused embeddings as the fused embeddings of the candidate future intents.

In some implementations, the respective future trajectory prediction for a candidate future intent can include a respective score for each of one or more variations of the candidate future intent that represents a predicted likelihood that the variation is a most similar trajectory to an actual future trajectory of the target agent.

For example, the predicted likelihood can be a joint likelihood (e.g., P (variation ji, candidate future intent i) that variation j of candidate future intent i is the most similar), or a conditional likelihood (e.g., P (variation ji|candidate future intent i) that variation j of candidate future intent i is the most similar to the actual future trajectory given that candidate future intent i is the most similar to the actual future trajectory).

If the predicted likelihood is a conditional likelihood, the set of scores can also include a respective predicted likelihood for each candidate future intent that defines the respective likelihood that the candidate future intent characterizes a most similar intent to the actual future trajectory of the target agent.

In one example, the predictor neural network 230 can include a likelihood decoder head that is configured to process the fused embedding of a candidate future intent to generate the respective set of scores for the candidate future intent.

The likelihood decoder head can include, e.g., one or more fully-connected neural network layers, where the final layer outputs M likelihoods, one respective likelihood for each of M variations of the respective candidate future intent.

In some implementations, the respective future trajectory prediction for each candidate future intent can also include a respective regression output for each of the variations of the candidate future intent that characterizes the variation, i.e., that defines the trajectory represented by the variation. Instead of directly regressing the future states along the variation, the system can instead generate an output that defines a probability distribution over possible future states of the agent at each of the multiple different time points. For example, for each candidate future intent, the respective regression output for each of the variations of the candidate future intent can define a respective probability distribution (e.g., a Gaussian distribution) for each of multiple future time points after the current time point that specifies, for each of multiple spatial positions, a respective likelihood that the target agent will occupy the respective spatial position at the future time point given that the variation represented by the regression output is the closest to the actual future trajectory of the target agent. The regression output can include information (e.g., x, y positions; x, y position uncertainties; speed and yaw, or x, y velocity components; etc.) for each future time point.

In one example, the predictor neural network 230 can include a regression decoder head that is configured to process the fused embedding of a candidate future intent to generate the respective set of regression outputs for the candidate future intent. The regression decoder head can include, e.g., one or more fully-connected neural network layers, and a regression decoder (e.g., including one or more convolutional neural network layers, or recurrent neural network layers) which generates M regression outputs, one respective regression output for each of M variations of the respective candidate future intent.

Figure 3:
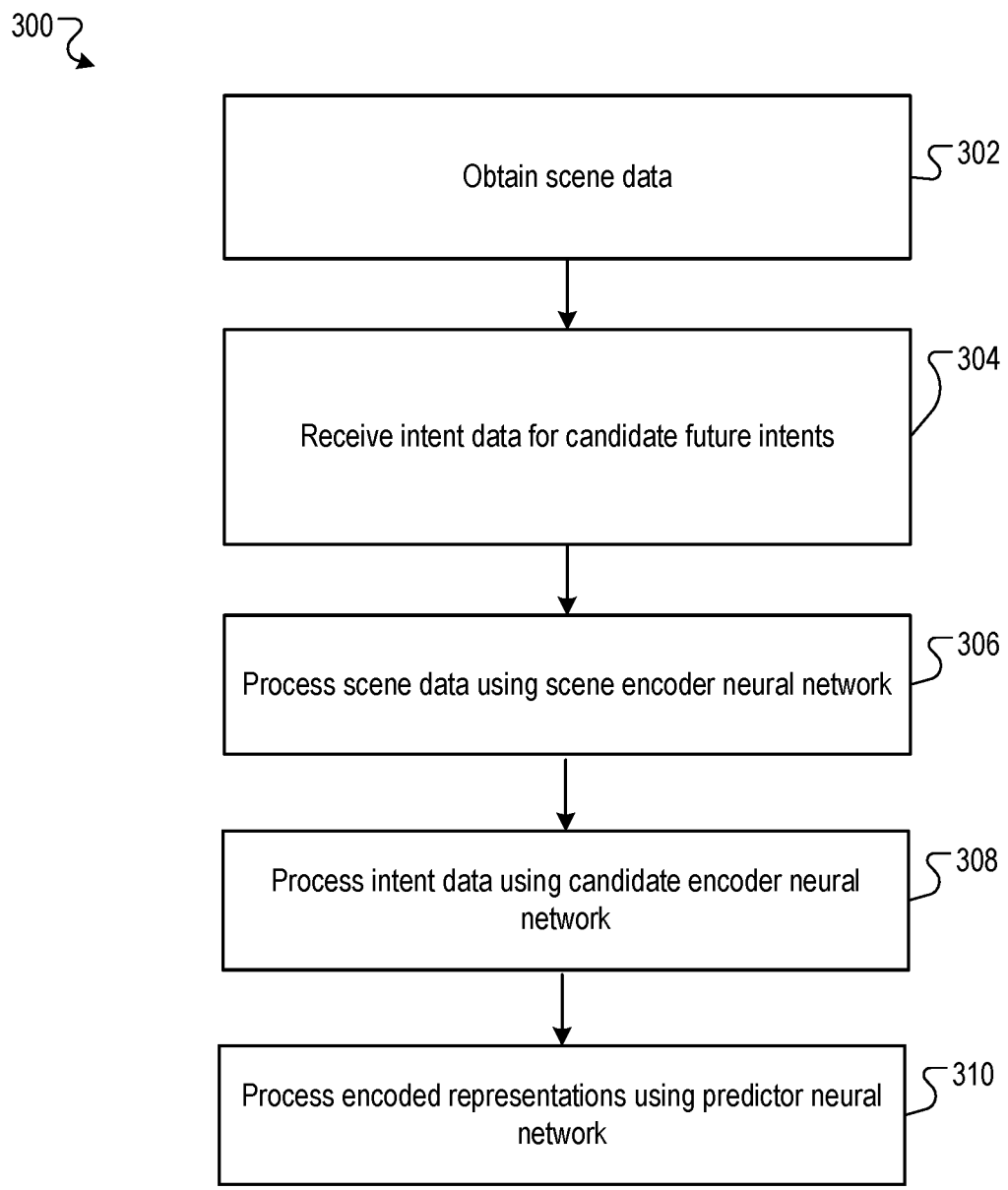
FIG. 3 is a flow diagram of an example process for generating a trajectory prediction output.

FIG. 3 is a flow diagram of an example process 300 for generating a trajectory prediction for an agent in the vicinity of the vehicle. For convenience, the process 300 will be described as being performed by a system of one or more computers located in one or more locations. For example, a trajectory prediction system, e.g., the trajectory prediction system 150 of FIG. 1, appropriately programmed in accordance with this specification, can perform the process 300.

In particular, the system performs the process 300 to generate a respective trajectory prediction for each of one or more target agents that are in the vicinity of the vehicle. An agent being in the vicinity of the vehicle refers to the agent being within range of one or more of the sensors of the vehicle.

The system obtains scene data characterizing the environment (step 302). As described above, the scene data includes data characterizing trajectories of each of a plurality of agents (including the target agent(s)) in the environment at a current time point and data characterizing a plurality of road features in the environment. Road features can include driving lanes, crosswalks, traffic lights, speed bumps, traffic signs, and so on.

The system then performs steps 304-310 for each of the target agent(s).

The system receives, for each of a plurality of candidate future intents for the target agent after the current time point, respective intent data that characterizes the candidate future intent (step 304). That is, the system receives respective intent data for each of multiple candidate future intents.

The system processes the scene data using a scene encoder neural network to generate an encoded representation of the scene data (step 306).

The system processes the respective intent data for each of the candidate future intents using a candidate encoder neural network to generate a respective encoded representation of each of the candidate future intents (step 308).

The system processes the encoded representation of the scene and the respective encoded representations of each of the candidate future intents using a predictor neural network to generate a trajectory prediction output for the target agent (step 310).

As described above, the trajectory prediction output includes a respective future trajectory prediction for each of the respective candidate future intents.

Figure 4:
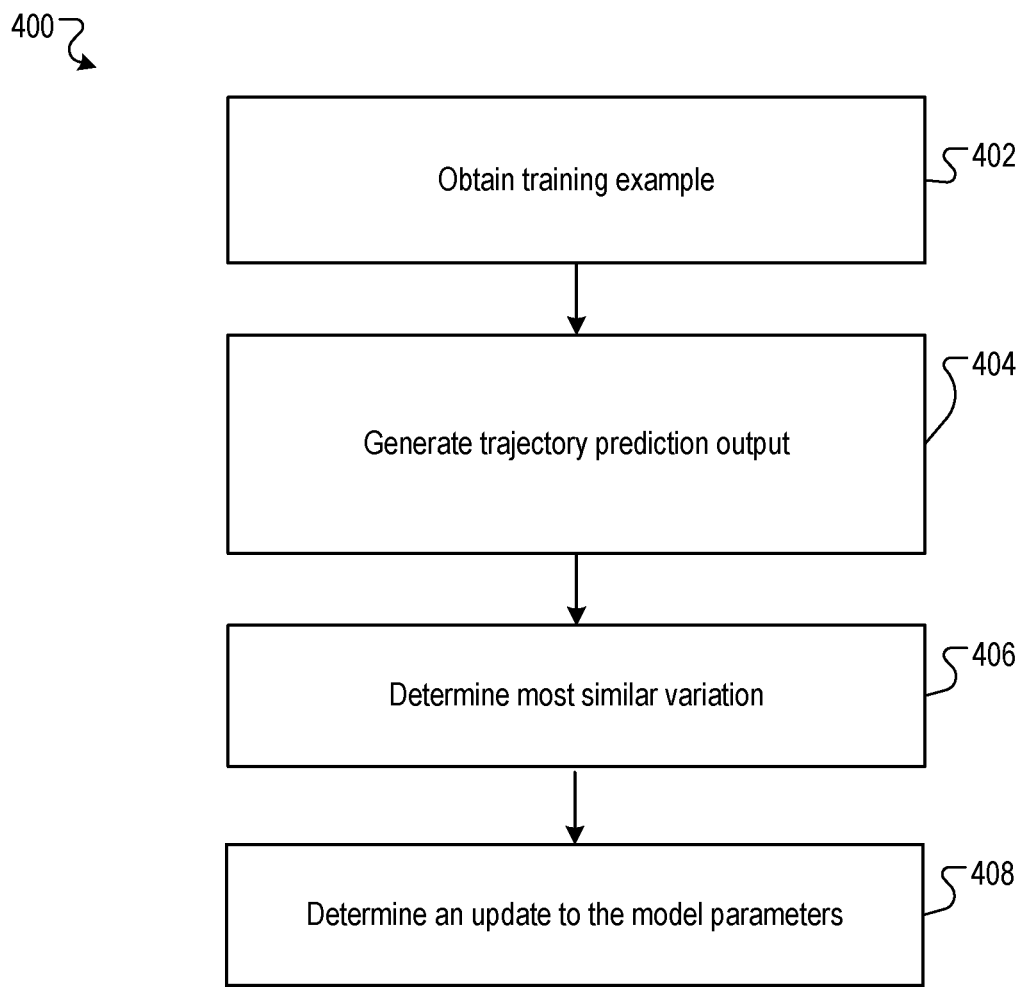
FIG. 4 is a flow diagram of an example process for training the trajectory prediction output.

FIG. 4 is a flow diagram of an example process 400 for training the scene encoder neural network, the candidate encoder neural network, and the predictor neural network. For convenience, the process 400 will be described as being performed by a system of one or more computers located in one or more locations. For example, a training system, e.g., the training system 150 of FIG. 1, appropriately programmed in accordance with this specification, can perform the process 400.

As described above, prior to using the components of the trajectory prediction system, i.e., the scene encoder neural network, the candidate encoder neural network, and the predictor neural network, the training system trains these components so that the trajectory prediction system can accurately generate trajectory predictions given a set of candidate future intents.

The system can perform the process 400 for each ground truth agent trajectory in a mini-batch of one or more ground truth agent trajectories sampled from a training set of ground truth agent trajectories to determine a respective model parameter update for each of the ground truth agent trajectories. The system can then combine, e.g., average or add, the respective model parameter updates to generate a combined update and then apply the combined update to the current values of the model parameters, e.g., in accordance with an optimizer being used for the training, e.g., the Adam optimizer, the rmsProp optimizer, or the stochastic gradient descent optimizer.

By repeatedly updating the model parameter values in this manner for different mini-batches of ground truth agent trajectories, the system can train the trajectory prediction system to generate accurate trajectory prediction outputs.

The system obtains a training example that includes scene data for an agent as of a first time point, a set of candidate future intents for the agent after the first time point, and a ground truth agent trajectory for the agent that identifies the actual trajectory followed by the agent after the first time point (step 402).

The system processes the context data and the candidate future intents using the trajectory prediction system as described above and in accordance with the current values of the model parameters, i.e., in accordance with current values of the parameters of the various neural network components, e.g., the scene encoder neural network, the candidate encoder neural network, and the predictor neural network, to generate a trajectory prediction output (step 404).

The system computes the most similar variation to the ground truth trajectory (step 406).

The system can determine which variation is the most similar variation by first finding a most similar candidate future intent to the ground truth future trajectory and then finding the most similar variation of the most similar candidate future intent.

For example, the system can measure a respective similarity measure between each candidate future intent and the actual future trajectory for the target agent (e.g., using a chamfer matching method or geometric similarity that uses a squared error between the candidate future intent and the geometric information of the actual future trajectory for the target agent). The system can select the most similar candidate future intent based on the candidate similarity measures (e.g., by selecting the candidate future intent with the largest similarity measure). Then, the system can determine a respective similarity measure between each variation of the most similar candidate future intent and the actual future trajectory of the target agent (e.g., using a speed profile matching method, such as a squared error, between the variation and the actual future trajectory of the target agent). The system can determine the most similar variation based on the variation similarity measures (e.g., by selecting the variation with the largest similarity measure).

The system determines an update to the current values of the model parameters by computing a gradient with respect to the model parameters of an objective function (step 408). Because the system trains the components of the trajectory prediction system jointly, the system can backpropagate gradients of the objective function through the different components of the trajectory prediction system.

Generally, the objective function measures a similarity between the trajectory prediction output and the actual future trajectory of the target agent as determined by the ground-truth trajectory and is evaluated based on the most similar variation to the ground truth trajectory.

In some implementations, the objective function can include a classification loss that measures an error between (i) the respective scores for the variations for the candidate future intents, and (ii) a target set of scores that indicate a most similar variation to the actual future trajectory of the target agent. For example, the classification loss term can include a cross-entropy loss between the respective scores generated by the system, and the target set of scores (e.g., represented by a one-hot encoding, where a one indicates the most similar variation).

In some implementations, the objective function can include a regression loss that measures an error between (i) the regression output for the most similar variation, and (ii) the actual future trajectory for the target agent. For example, the regression loss term can include a sum of the spatial position loss at each future time point in the future trajectories, where the spatial position loss at a future time point can be determined as the squared error between the regression output of the most similar variation for the spatial position and the spatial position of the actual future trajectory. As another example, in the cases where the respective regression output for the most similar variation defines a respective probability distribution (e.g., Gaussian) for each of multiple future time points after the current time point, the regression loss term can similarly include a sum of the spatial position loss at each future time point in the future trajectory. In this case, the spatial position loss for the spatial position at a future time point can be determined as the negative log of the probability assigned to the spatial position of the actual future trajectory (e.g., the ground truth location) at the future time point by the respective probability distribution for the future time point.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
obtaining scene data characterizing a scene in an environment that includes one or more agents at a current time point, the one or more agents including a target agent;
receiving, for each of a plurality of candidate future intents for the target agent after the current time point, respective intent data that characterizes the candidate future intent;
processing the scene data using a scene encoder neural network to generate an encoded representation of the scene data;
processing the respective intent data for each of the candidate future intents using a candidate encoder neural network to generate a respective encoded representation of each of the candidate future intents; and
processing the encoded representation of the scene data and the respective encoded representations of each of the candidate future intents using a predictor neural network to generate a respective trajectory prediction output that comprises a respective future trajectory prediction for each of the respective candidate future intents; and
causing an autonomous vehicle to follow a planned path using the respective prediction output.

2. The method of claim 1, wherein the plurality of candidate future intents are received from a behavior prediction system that predicts likely candidate future intents for the target agent conditioned on the scene in the environment at the current time point.

3. The method of claim 1, wherein the respective intent data that characterizes each of the candidate future intents comprises geometric data characterizing a sequence of waypoint spatial locations in the environment.

4. The method of claim 3, wherein the respective intent data that characterizes each of the candidate future intents further comprises semantic data characterizing an action type of the candidate future intent.

5. The method of claim 3, wherein the respective intent data that characterizes each of the candidate future intents further comprises reference data characterizing objects in the environment corresponding to the candidate future intent.

6. The method of claim 1, wherein the predictor neural network is configured to combine the encoded representation of the scene data and the respective encoded representations of each of the candidate future intents to generate a respective fused embedding of each of the candidate future intents, and wherein for each candidate future intent the predictor neural network processes the respective fused embedding of the candidate future intent to generate the respective future trajectory prediction for the candidate future intent.

7. The method of claim 1, wherein, for each candidate future intent, the respective future trajectory prediction comprises a respective score for each of a plurality of variations of the candidate future intent that represents a predicted likelihood that the variation will be a most similar trajectory to an actual future trajectory of the target agent.

8. The method of claim 7, wherein, for each candidate future intent, the respective future trajectory prediction further comprises a respective regression output for each of the plurality of variations of the candidate future intent that characterizes the variation.

9. The method of claim 8, wherein, for each candidate future intent, the respective regression output for each of the plurality of variations of the candidate future intent defines a respective probability distribution for each of a plurality of future time points after the current time point that specifies for each of a plurality of spatial positions a respective likelihood that the target agent will occupy the respective spatial position at the future time point given that the variation represented by the regression output is the closest to the actual future trajectory of the target agent.

10. The method of claim 8, wherein the scene encoder neural network, the candidate encoder neural network, and the predictor neural network have been trained to optimize an objective function, wherein the objective function measures a similarity between the trajectory prediction output and the actual future trajectory of the target agent.

11. The method of claim 10, wherein the objective function includes a classification loss that measures an error between (i) the respective scores for the variations for the candidate future intents, and (ii) a target set of scores that indicate a most similar variation to the actual future trajectory of the target agent.

12. The method of claim 11, wherein the objective function includes a regression loss that measures an error between (i) the respective regression output for the most similar variation, and (ii) the actual future trajectory for the target agent.

13. The method of claim 1, wherein the scene data comprises (i) road data characterizing a plurality of road features in the environment, and (ii) agent data characterizing the state of each agent at the current time point and at each of a plurality of previous time points before the current time point.

14. The method of claim 13, wherein the scene encoder neural network includes a plurality of input heads, wherein each input head is configured to generate a respective feature embedding of a corresponding type of scene data, and wherein the scene encoder neural network is configured to combine the respective embeddings generated by the input heads to generate the encoded representation of the scene data.

15. The method of claim 14, wherein the plurality of input heads comprises (i) a road encoder head to generate a respective road feature embedding for each of the plurality of road features, (ii) a history encoder head to generate a respective agent state history embedding characterizing the state of the target agent at the current time point and at each of a plurality of previous time points before the current time point, and (iii) an interaction encoder head to generate a respective interaction embedding characterizing the motion of other agents in the environment relative to the target agent.

16. The method of claim 14, wherein the scene encoder neural network combines the respective embeddings generated by the plurality of input heads using a context encoder to generate the encoded representation of the scene data.

17. The method of claim 1, wherein each of the one or more agents is an agent in a vicinity of the autonomous vehicle in an environment, and the scene data comprises data generated from data captured by one or more sensors of the autonomous vehicle.

18. The method of claim 17, wherein causing an autonomous vehicle to follow a planned path using the respective prediction output comprises:
providing the trajectory prediction output to an on-board planning system of the autonomous vehicle for use in controlling the autonomous vehicle.

19. The method of claim 1, wherein causing an autonomous vehicle to follow a planned path using the respective prediction output comprises:
controlling the autonomous vehicle using the respective prediction output.

20. A system comprising:
one or more computers; and
one or more storage devices storing instructions that, when executed by the one or more computers, cause the one or more computers to perform operations comprising:
obtaining scene data characterizing a scene in an environment that includes one or more agents at a current time point, the one or more agents including a target agent;
receiving, for each of a plurality of candidate future intents for the target agent after the current time point, respective intent data that characterizes the candidate future intent;
processing the scene data using a scene encoder neural network to generate an encoded representation of the scene data;
processing the respective intent data for each of the candidate future intents using a candidate encoder neural network to generate a respective encoded representation of each of the candidate future intents; and
processing the encoded representation of the scene data and the respective encoded representations of each of the candidate future intents using a predictor neural network to generate a respective trajectory prediction output that comprises a respective future trajectory prediction for each of the respective candidate future intents; and
causing an autonomous vehicle to follow a planned path using the respective prediction output.

21. One or more non-transitory computer-readable storage media storing instructions that when executed by one or more computers cause the one or more computers to perform operations comprising:
obtaining scene data characterizing a scene in an environment that includes one or more agents at a current time point, the one or more agents including a target agent;
receiving, for each of a plurality of candidate future intents for the target agent after the current time point, respective intent data that characterizes the candidate future intent;
processing the scene data using a scene encoder neural network to generate an encoded representation of the scene data;
processing the respective intent data for each of the candidate future intents using a candidate encoder neural network to generate a respective encoded representation of each of the candidate future intents; and
processing the encoded representation of the scene data and the respective encoded representations of each of the candidate future intents using a predictor neural network to generate a respective trajectory prediction output that comprises a respective future trajectory prediction for each of the respective candidate future intents; and
causing an autonomous vehicle to follow a planned path using the respective prediction output.

* * * * *